(12) United States Patent
Robillard et al.

(10) Patent No.: US 7,574,540 B2
(45) Date of Patent: Aug. 11, 2009

(54) MANAGING MANAGEMENT CONTROLLER COMMUNICATIONS

(75) Inventors: Michael N. Robillard, Shrewsbury, MA (US); Daniel A. Dufresne, II, Manchester, NH (US); Sharon A. Smith, Brookline, MA (US)

(73) Assignee: EMC Corporation, Hopkinton, MA (US)

( * ) Notice: Subject to any disclaimer, the term of this patent is extended or adjusted under 35 U.S.C. 154(b) by 353 days.

(21) Appl. No.: 11/325,001

(22) Filed: Jan. 3, 2006

(65) Prior Publication Data

US 2007/0174517 A1    Jul. 26, 2007

(51) Int. Cl.
G06F 13/12 (2006.01)
G06F 3/00 (2006.01)
G06F 13/00 (2006.01)

(52) U.S. Cl. .................. 710/62; 710/2; 710/5; 711/100

(58) Field of Classification Search ....................... 710/2
See application file for complete search history.

(56) References Cited

U.S. PATENT DOCUMENTS

| | | | |
|---|---|---|---|
| 6,378,084 B1 * | 4/2002 | Strunk et al. ................... | 714/2 |
| 2003/0110330 A1 | 6/2003 | Fijie et al. | |
| 2005/0108452 A1 * | 5/2005 | Loffink ........................ | 710/74 |
| 2005/0154826 A1 * | 7/2005 | Marks et al. ................. | 711/114 |

OTHER PUBLICATIONS

American National Standard, Information Technology—Serial Attached SCSI (SAS), Revision 5, Jul. 9, 2003, pp. 43, 51, 72, 261, 300, 353, http://www.t10.org/ftp/t10/drafts/sas/sas/-r05.pdf.*
Information Technology—SCSI Primary Commands -3 (SPC-3), Revision 23, May 4, 2005, pp. 90, 91, 189, 235, 236, http://www.t10.org/ftp/t10/drafts/spc3/spc3r23.pdf.*
"The I2C Bus Protocol" Jul. 11, 2001, LPC Tools, http://web.archive.org/web/20010711042456/http://www.esacademy.com/faq/i2c/general/i2cproto.htm.*
International Search Report.
International Written Opinion.

* cited by examiner

*Primary Examiner*—Alan Chen (57) ABSTRACT

A data storage system includes a first and second boards disposed in a chassis. The first board has disposed thereon a first Serial Attached Small Computer Systems Interface (SAS) expander, a first management controller (MC) in communication with the first SAS expander, and management resources accessible to the first MC. The second board has disposed thereon a second SAS expander and a second MC. The system also has a communications link between the first and second MCs. Primary access to the management resources is provided in a first path which is through the first SAS expander and the first MC, and secondary access to the first management resources is provided in a second path which is through the second SAS expander and the second MC.

18 Claims, 9 Drawing Sheets

MANAGING MANAGEMENT CONTROLLER COMMUNICATIONS

This patent application incorporates by reference the entire subject matter in copending U.S. patent application Ser. No. 11/238,601 filed Sep. 29, 2005, entitled RAID DATA STORAGE SYSTEM WITH SAS EXPANSION, which is assigned to the same assignee as the present invention.

BACKGROUND

This invention relates to managing management controller communications.

As is known in the art, large mainframe computer systems and data servers sometimes require large capacity data storage systems. One type of data storage system is a magnetic disk storage system. Here a bank of disk drives and the computer systems and data servers are coupled together through an interface. The interface includes CPU controllers, commonly referred to as storage processors, that operate in such a way that they are transparent to the computer. Typically a pair of such processors is used for redundancy. That is, data is stored in, and retrieved from, the bank of disk drives in such a way that the mainframe computer system or data server merely thinks it is operating with one mainframe memory. One type of data storage system is a RAID data storage system. A RAID data storage system includes two or more disk drives in combination for fault tolerance and performance.

As is also known in the art, it is sometimes desirable that the data storage capacity of the data storage system be expandable. More particularly, a customer may initially require a particular data storage capacity. As the customer's business expands, it would be desirable to corresponding expand the data storage capacity of the purchased storage system.

Small Computer Systems Interface ("SCSI") is a set of American National Standards Institute ("ANSI") standard electronic interface specification that allow, for example, computers to communicate with peripheral hardware.

SCSI interface transports and commands are used to interconnect networks of storage devices with processing devices. For example, serial SCSI transport media and protocols such as Serial Attached SCSI ("SAS") and Serial Advanced Technology Attachment ("SATA") may be used in such networks. These applications are often referred to as storage networks. Those skilled in the art are familiar with SAS and SATA standards as well as other SCSI related specifications and standards.

SUMMARY

A data storage system includes a first and second boards disposed in a chassis. The first board has disposed thereon a first Serial Attached Small Computer Systems Interface (SAS) expander, a first management controller (MC) in communication with the first SAS expander, and management resources accessible to the first MC. The second board has disposed thereon a second SAS expander and a second MC. The system also has a communications link between the first and second MCs. Primary access to the management resources is provided in a first path which is through the first SAS expander and the first MC, and secondary access to the first management resources is provided in a second path which is through the second SAS expander and the second MC.

One or more implementations of the invention may provide one or more of the following advantages.

In a data storage system, a primary diagnostic path for a set of components can also be used as a cost-effective secondary (redundant) diagnostic path for a peer set of components. If a controller card fails, a diagnostic path to the failed card's peer can be used to diagnose the failed card. Memory components that store vital product data about the system can be reached via two independent paths, which helps ensure access to the data, e.g., for diagnostic, service, and management purposes. If a component fails a power on self test (POST), the secondary diagnostic path can be used to read a POST log from memory on the component to determine a POST stage (e.g., memory test) at which POST failed.

The details of one or more embodiments of the invention are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION

Figure 1:
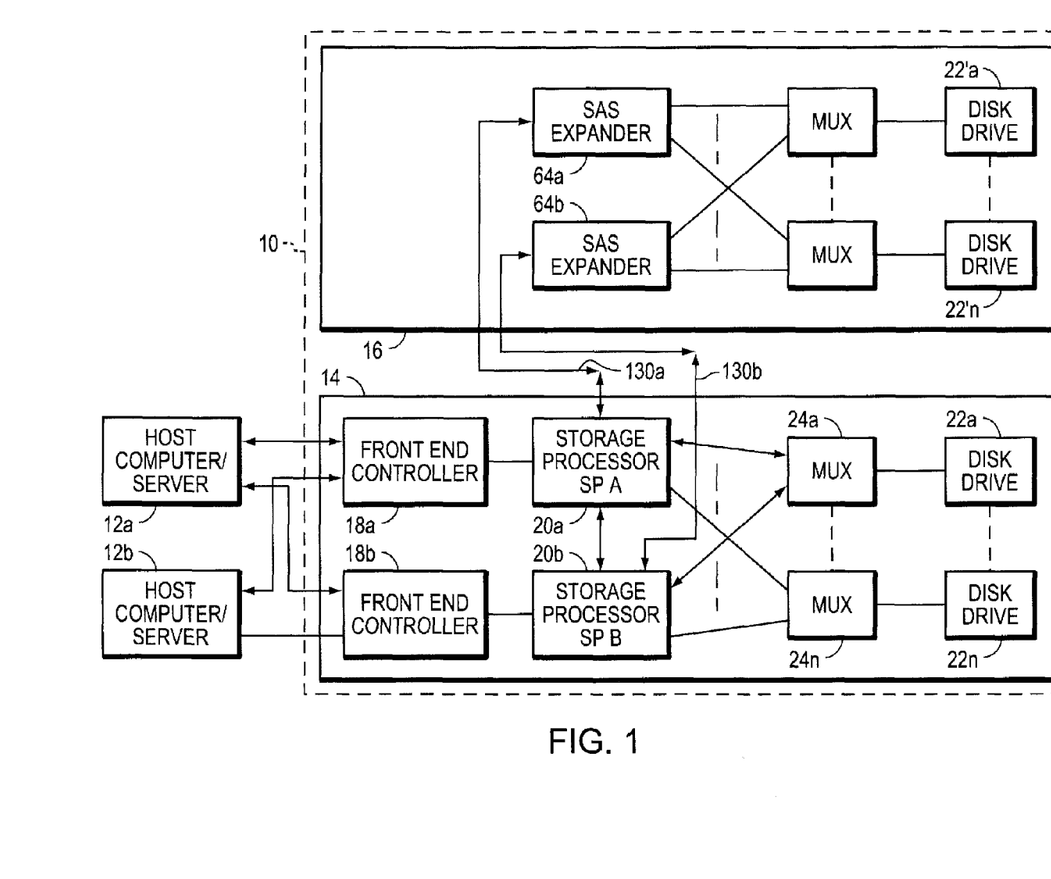
FIGS. 1-3 are block diagrams of a RAID data storage system with SAS expansion.

FIG. 1 shows a data storage system 10 coupled to a pair of host computer/servers 12a, 12b, as shown. The data storage system 10 includes, here for example, two chassis or enclosures 14, 16, as shown. Enclosure 14 is sometimes referred to herein as a Disk Processor Enclosure (DPE) and enclosure 16 is sometimes referred to herein as a Disk Array Enclosure (DAE). The DPE 14 and DAE 16 are described below in more detail in connection with FIGS. 2 and 3, respectively. Suffice it to say here that DPE 14 includes a pair of front end controllers 18a, 18b, each having a pair of ports coupled to the pair of host computer/servers 12a, 12b, as shown. The DPE 14 also includes a pair of storage processors (SPs) 20a, 20b coupled to each other with storage processor 2a being connected to front end controller 18a and storage processor 20b being connected to front end controller 18b, as shown. The storage processors 20a and 20b are connected to a bank of disk drives 22a-22n though multiplexers 24a-24n, as shown.

The storage processors 20a, 20b of DPE 14 are connected to the DAE 16 though a pair of cables 130a, 130b, respectively, as shown. As is described in more detail in connection with FIG. 3, the DAE 16 includes additional disk drives 22'a-22'n, here for example, twelve disk drives, and is used to increase the storage capacity of the data storage system 10. Thus, in this example, the number of disk drives 22a-22n in DPE 14 is twelve and the user has chosen to expand the storage capacity to twenty four disk drives by connecting the DAE 16 which in this example includes twelve disk drives 22'a-22'n.

Figure 2:
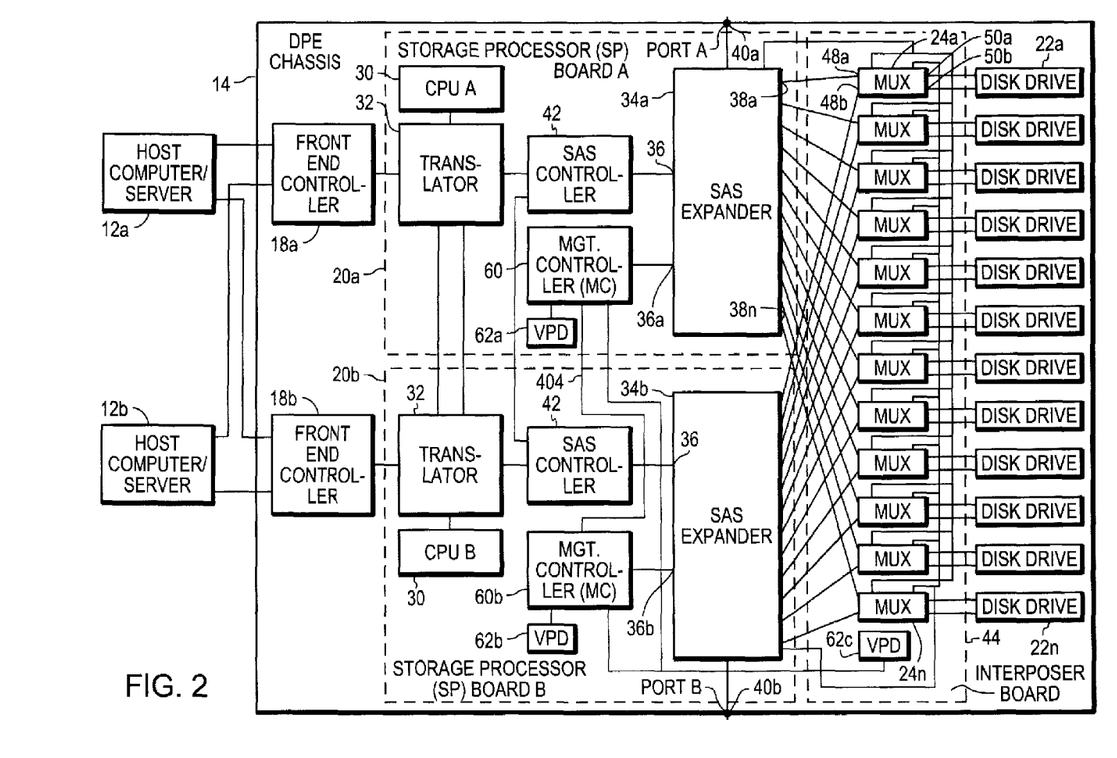

FIG. 2 shows the pair of storage processors 20a, 20b, each disposed on a corresponding one of a pair of printed circuit boards STORAGE PROCESSOR (SP) BOARD A and STORAGE PROCESSOR (SP) BOARD B, respectively, as indicated. Each one of the printed circuit boards has disposed thereon: (a) a processor 30; (b) a translator 32 controlled by the processor 30; (c) a SAS expander 34a on STORAGE PROCESSOR (SP) BOARD A and SAS expander 34b on STORAGE PROCESSOR (SP) BOARD B each having a bidirectional front end port 36 and a plurality of bidirectional backend ports 38a-38n, and an expansion port 40a for STORAGE PROCESSOR (SP) BOARD A and 40b STORAGE PROCESSOR (SP) BOARD B; and (d) a SAS controller 42 coupled between the translator 32 and the expander controller 34; as shown. The DPE 14 also includes an interposer printed circuit board 44 having thereon the plurality of, here twelve, multiplexers 24a-24n.

Each one of the multiplexers 24a-24n has: (a) a pair of bidirectional front end ports 48a, 48b; and (b) a pair of bidirectional back end ports 50a, 50b. For each one of the plurality of multiplexers 24a-24n, a first one of the pair of bidirectional front end ports for example port 48a is connected to a corresponding backend port 38a of the SAS expander 34a disposed on a first one of the pair of storage processor printed circuit boards, here STORAGE PROCESSOR (SP) BOARD A; and a second one of the pair of bidirectional front end ports 48b is connected to a corresponding backend port 38n of the SAS expander 34b disposed on a second one of the pair of storage processor printed circuit boards here STORAGE PROCESSOR (SP) BOARD B.

As noted above, the DPE 14 includes a plurality of disk drives 22a-22n. Each one of the disk drives is coupled to at least one backend port 50a, 50b of a corresponding one of the plurality of multiplexers 22a-22n.

The DPE 14 also includes a pair of management controllers 60, each one being disposed on a corresponding one of the pair of storage processor printed circuit boards here STORAGE PROCESSOR (SP) BOARD A and here STORAGE PROCESSOR (SP) BOARD B, as shown. A first of the pair of management controllers 60, here the controller 60 disposed on STORAGE PROCESSOR (SP) BOARD A includes an additional front end port 36a of the SAS expander 34a disposed on such storage processor printed circuit boards and the second one of the pair of management controllers 60b disposed on the STORAGE PROCESSOR (SP) BOARD B is coupled to an additional front end port 36b of the SAS expander 34b as shown.

Devices 62a, 62b, 62c including memory holding Vital Product Data and peripheral devices are herein collectively referred to as Vital Product Data (VPD), and are disposed on the STORAGE PROCESSOR (SP) BOARD A, STORAGE PROCESSOR (SP) BOARD B and interposer board 44, respectively, as shown. VPDs 62a, 62b, and 62c are coupled to the pair of management controllers 60 on the STORAGE PROCESSOR (SP) BOARDS A and B, as shown. Vital Product Data includes information programmed by the factory into a "resume" EEPROM on some Field Replaceable Units (FRUs), generally containing some unique information on each part such as a World Wide Number and serial number. The term "VPD" is often used to refer to the EEPROM itself. Here, there is a VPD EEPROM on each STORAGE PROCESSOR (SP) BOARD A, STORAGE PROCESSOR (SP) BOARD B and interposer board 44.

Figure 3:
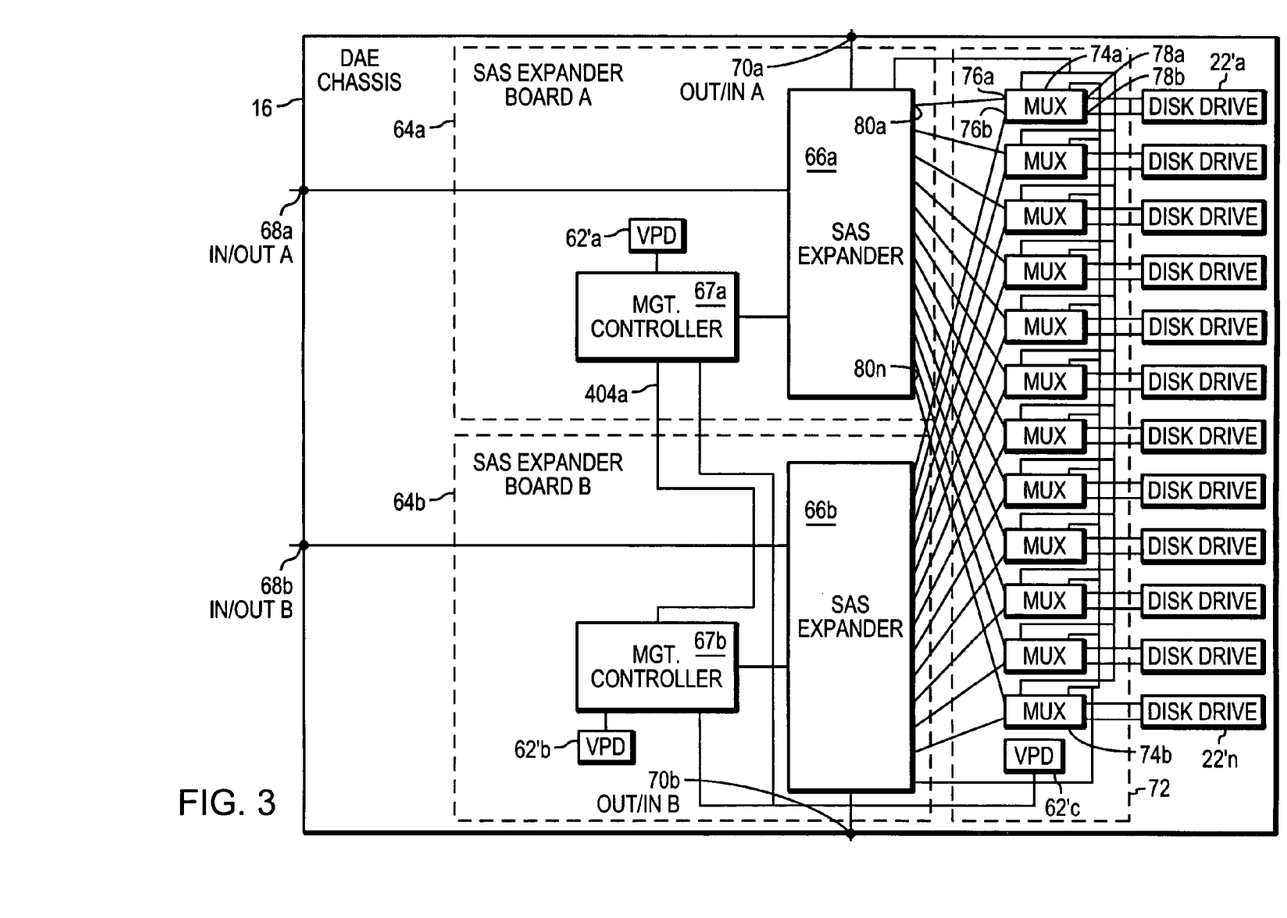

Referring now to FIG. 3, DAE 16 is shown to include a pair of SAS expander printed circuit boards (SEBs) 64a, 64b, a pair of SAS expanders 66a, 66b, each one being disposed on a corresponding one of the pair of SAS expander printed circuit boards 64a, 64b, each one of the pair of SAS expanders 66a, 66b has a bidirectional front end expansion port 68a, 68b,respectively, and a bidirectional backend expansion port 70a, 70b, respectively.

Also included in DAE 16 is an interposer printed circuit 72 board. A plurality of, here twelve, multiplexers 74a-74n is disposed on the interposer printed circuit board 72, each one of the plurality of multiplexers 74a-74n includes (a) a pair of bidirectional front end ports 76a, 76b; (b) a pair of bidirectional back end ports 78a, 78b. For each one of the multiplexers 74a-74n, a first one of the pair of bidirectional front end ports here port 76a, for example, is connected to a corresponding one of backend ports 80a-80n of the SAS expander 66a and a second one of the pair of bidirectional front end ports, here 76b, for example, is connected to a corresponding backend port of the SAS expander 66b as shown. The DAE 16 includes, as noted above, the plurality of disk drives 22'a-22'n, each one being coupled to at least one backend port 78a, 78b of a corresponding one of the plurality of multiplexers 74a-74n.

Referring again also to FIGS. 1 and 2, the bidirectional front end expansion ports 40a,40b of SAS expanders 34a, 34b are connected to the expansion ports 70a, 70b, respectively, as shown. Thus, SAS expander 34a is connected to SAS expander 64a through cable 130a and SAS expander 34b is connected to SAS expander 64b through cable 130b. Thus, referring to FIG. 1, data can pass between any one of the host computer/servers 12a, 12b and any one of the here twenty four disk drives 22a-22n and 22'a-22'n.

Referring again to FIG. 3, as with DPE 14 (FIG. 2) the DAE 16 includes a pair of management controllers 67a, 67b, each one being disposed on a corresponding one of the pair of expander printed circuit boards, a first of the pair of expansion board management controllers being coupled to an additional front end port of the SAS expander disposed on the first one of the pair of expander printed circuit boards and a second one the pair of expansion management controllers being coupled to an additional front end port of the SAS expander disposed on the second one of the pair of expander printed circuit boards.

Further, as with the DPE 14, the DAE 16 includes VPDs 62'a, 62'b, 62'c having Vital Product Data (VPD).

Figure 4:
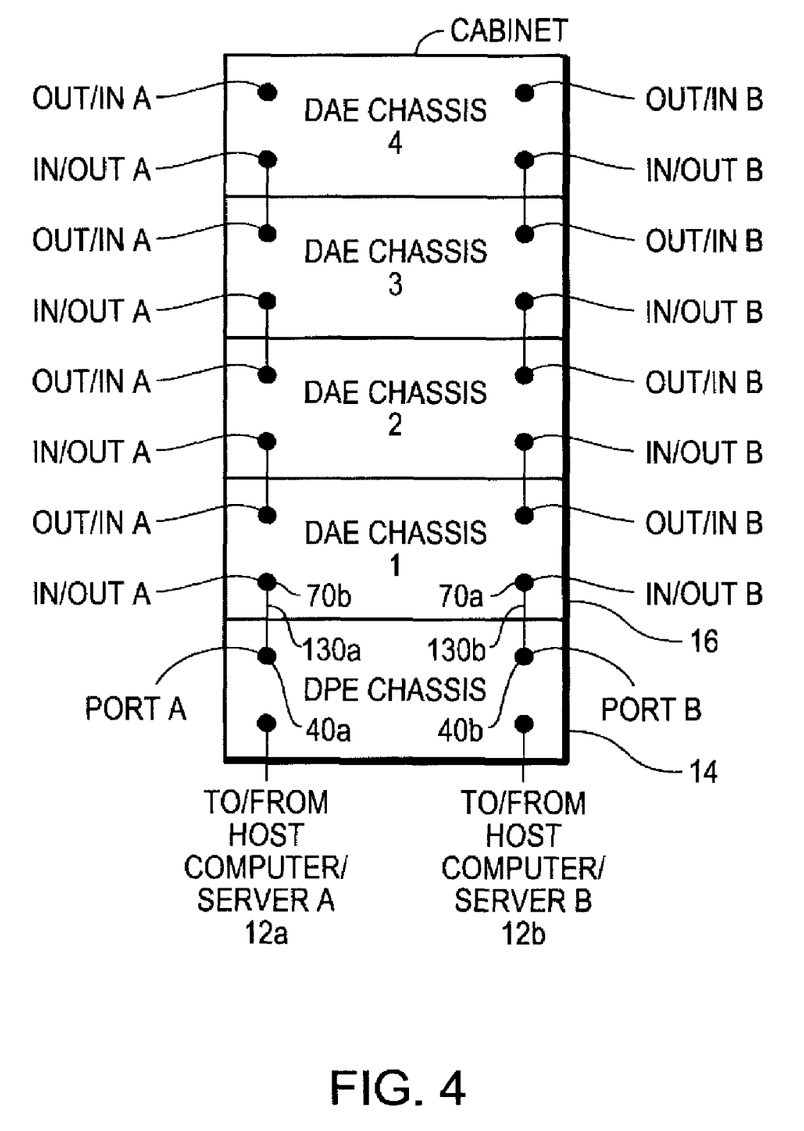
FIG. 4 is a block diagram of interconnections of enclosures in a RAID data storage system with SAS expansion.

Thus, the data storage system 10 (FIG. 1) may be further expanded as shown in FIG. 4 in a cabinet here having four DAEs 16 and a DPE 12. As noted above, here a DPE has up to 12 disk drives, and each one of the four DAEs, has 12 disk drives to provide, in this example, a data storage system having up to 60 disk drives. The connections between enclosures consist of standard SAS signals and cables.

Each one of the cables includes four SAS lanes so that at any one instant in time, at most 4 messages can be going to 4 different drives, but successive messages can be sent to different drives using the same SAS lane. Those 4 lanes are also used to send traffic to drives on downstream expanders, so a message can be sent on one of the input lanes, out one of the 4 output lanes to an input lane on the next box.

In the DPE there are eight lanes between the translator and the SAS controller; four SAS lanes between the pair of SAS controllers; one SAS lane between each multiplexer and a backend SAS port; and four lanes at each of the expansion ports 40a, 40b. For each DAE there are four SAS lanes between each one of the ports 70a, 70b and the connected one of the pair of SAS expanders 64a, 64b, respectively, and one SAS lane between each multiplexer and a backend SAS port.

Each management controller (MC) handles numerous features including power control, storage processor power sequencing, and reset control; fan monitoring; temperature monitoring; voltage monitoring; event and warning logging; and MC communications as described below.

Figure 5:
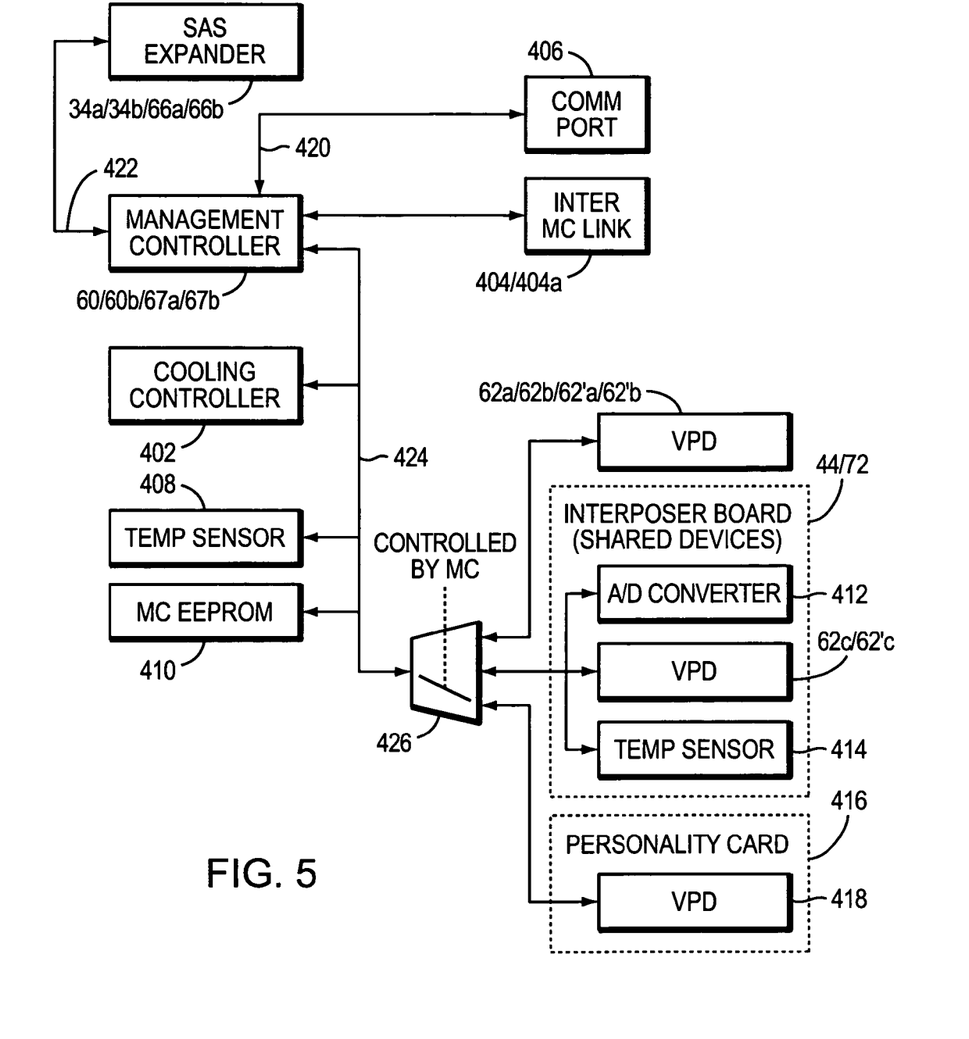
FIGS. 5-6, 8 are block diagrams of a management controller and related functionality in a RAID data storage system with SAS expansion.

The MC may be or include a microcontroller and has several communications links which are used to communicate with onboard peripherals, the local expander serving as SMBus host, a user terminal, and its MC peer (i.e., the other MC in the enclosure, either DPE or DAE). FIG. 5 illustrates MC communications links, particularly to the SMBus host (expander), its MC peer, a cooling controller, and a communications port.

FIG. 5 shows MC-related communications links 422, 420, 404/404a, 424 to various management resources. Link 422 is an SMBus communications link from the SMBus host (expander 34a/34b/66a/66b) to the MC 60/60b/67a/67b as described below. Traffic includes a stream of data which has flow control and is protected by a CRC.

Link 420 is a console link which is serial communications link described below. The MC can connect directly to RJ45 communications port 406 and commands are directly interpreted by the MC. In particular, the MC has a serial port which provides a connection to a user terminal via link 420. Link 420 runs at 9600 baud, 8 data bits, no parity, 1 stop bit. In a specific implementation, the MC provides neither hardware nor software handshaking. The MC communicates with the user terminal using a command set described below.

Link 424 is an Inter-Integrated Circuit (I2C) peripheral link which is an I2C communication link from the MC (sometimes through a multiplexor 426) to management resources including its peripherals including interposer board 44/72, personality card 416, temperature sensors 408, 414, EEPROMs 410, cooling controller 402, and an A/D converter 412, VPD memories 418, 62a/62b/62'a/62'b.

Link 404/404a is an inter-MC link which is a serial communications link as described below used to pass peer-to-peer MC commands as described below. This link is protected by both parity and a checksum. In particular, the MC has serial port which provide a connection to the MC peer. Link 404/404a runs at 38,400 baud, 8 data bits, parity, 1 stop bit, with no hardware or software handshaking. The MC implements commands described below.

Figure 6:
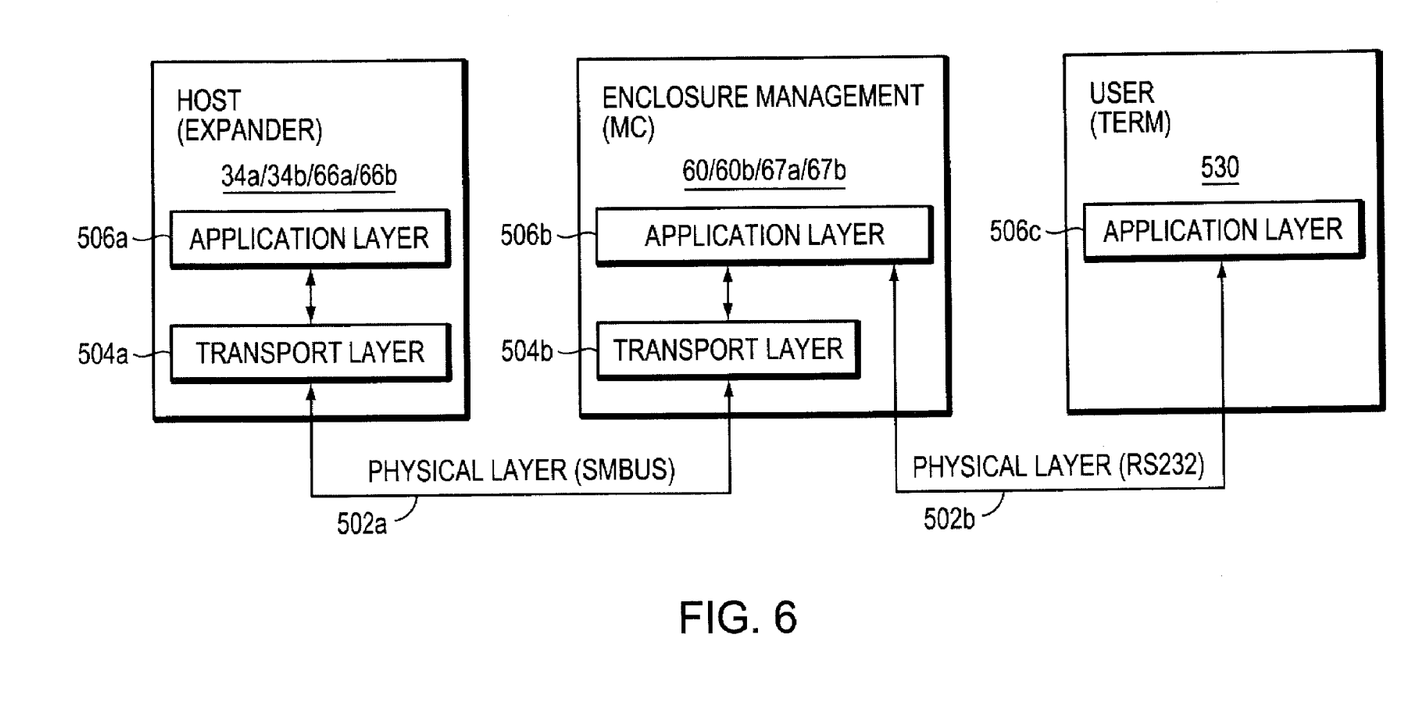

As illustrated in FIG. 6, a protocol scheme ("protocol") is used to provide reliable communications paths to and from each MC. The protocol includes three layers. A physical layer 502a/502b conveys a bit stream through a network at the electrical and mechanical level and provides the hardware means of sending and receiving data on a carrier. Two physical layer types are supported: SMBus 502a (e.g., link 422 of FIG. 5) and RS232 (serial) 502b (e.g., link 420 of FIG. 5).

A transport layer 504a/504b provides transparent transfer of data between end points and is responsible for end-to-end error detection, recovery, and flow control.

An application layer 506a/506b/506c supports commands described below which can be used to transfer data.

With respect to the physical layer, SMBus 502a is a two-wire interface through which various system components can communicate with each other. The SMBus host (expander) is the interface master and the MC is the interface slave. The interface can run up to 400 kHz, but may limited by the clock rate of the master.

The MC's serial port provides a connection to the user terminal via a main system console. The RS-232 interface runs at 9600 baud, 8 data bits, no parity, 1 stop bit and is provided to support, for example, a user typing at a terminal or a terminal emulation program.

Figure 7:
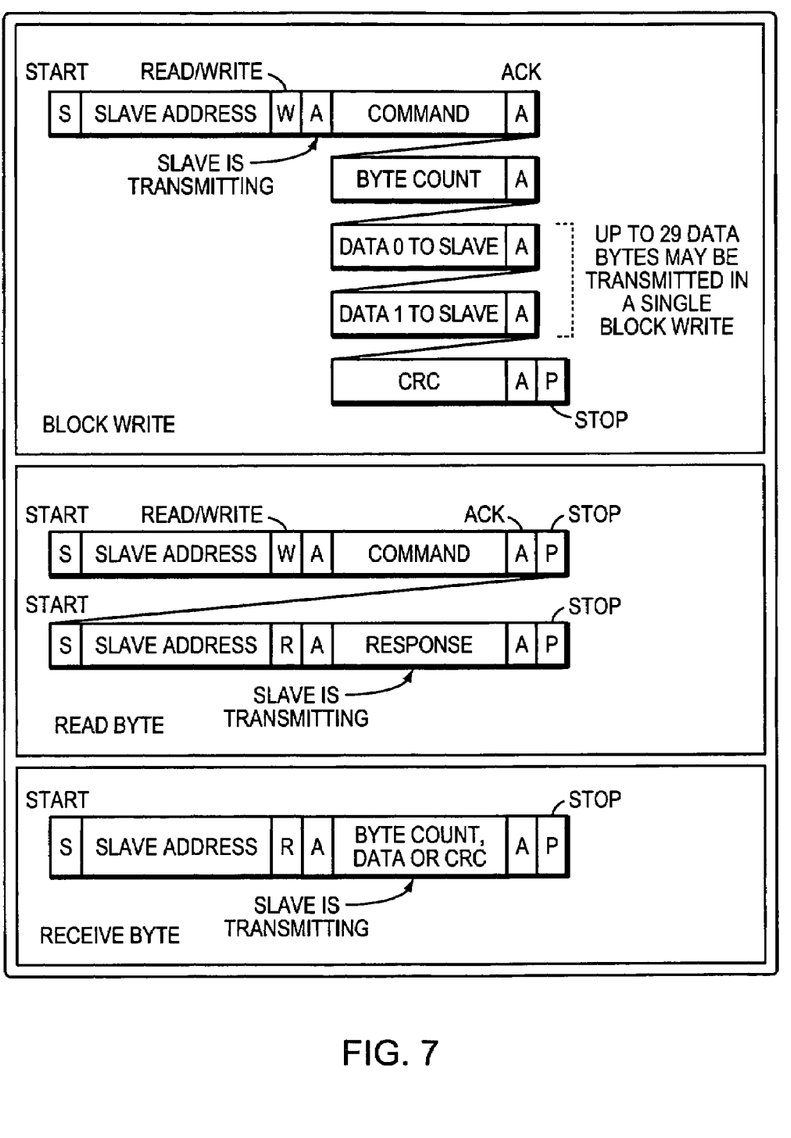
FIG. 7 is an illustration of data protected communication with a management controller in a RAID data storage system with SAS expansion.

The transport layer adds flow control, data protection, and framing. Each application layer data payload that uses the SMBus physical layer is wrapped in a packet as shown in FIG. 7. The transport layer uses three SMBus primitives to transfer data between the SMBus host and the MC. All transactions follow the same basic format:

(1) one or more block writes to transfer an application layer payload from the SMBus host to a buffer in the MC, (2) one or more read bytes to initiate the transfer of data from the MC, and (3) one or more receive bytes to finish the data transfer.

A Block Write primitive consists of a series of bytes which are transmitted by the SMBus host and acknowledged by the MC.

A Read Byte primitive consists of four bytes of which the first three are transmitted by the SMBus host and acknowledged by the MC. The fourth byte is transmitted by the MC and acknowledged by the SMBus host.

A Receive Byte primitive consists of two bytes of which the first is transmitted by the SMBus host and acknowledged by the MC. The second byte is transmitted by the MC and acknowledged by the SMBus host.

Every transport layer transaction begins with the SMBus host generating a Block Write primitive. This primitive has the Command byte set to "DATA", "ECHO", "POST_CODE" or "FAULT_CODE". Data packets are passed to the MC's application layer. Data packets contain application level commands. Echo packets are used to test the SMBus interface hardware. In at least one implementation, only one Block Write primitive (Echo only) may be sent at a time due to buffering limitations. POST_CODE and FAULT_CODE packets are unacknowledged messages generated in a stream by the SMBus host. The MC stores each received packet in a buffer, overwriting any previous data. The maximum size of a Block Write primitive is 32 bytes, which allows for a maximum of 29 bytes of data.

Data can be streamed to the MC (subject to any application layer limitations), by using multiple, sequential Block Write primitives. Each primitive transfers the next block of application layer data (up to 29 bytes).

Once the entire payload is transmitted to the MC, the SMBus host generates a Read Byte: Reset Pointer primitive which contains a single byte Response code from the MC.

If a Busy response is received, the SMBus host continues generating Read Byte: Reset Pointer primitives until either the status changes or a SMBus host defined limit is reached. Busy responses indicate that the MC is busy processing a previous command and are provided to help prevent buffer under run problems.

If an Unknown command, Bad CRC, Over/Under run response is received, the SMBus host determines that the command was received incorrectly. The SMBus host attempts to resend the command in an error handling mechanism.

If a Data or Echo response is received, the MC has either processed the command (Data) and has data for the SMBus host, or has the Echo data ready to be read back. The SMBus host generates sufficient Read Byte messages to empty the MC's buffer.

It is permissible for the MC's transport layer to split a single application layer payload into multiple transport layer packets, which are handled by the SMBus host.

Once an entire packet has been received by the SMBus host, the CRC is checked. If the CRC passes, the data is passed to the SMBus host's application layer. If the CRC fails, the SMBus host can issue another Read Byte: Reset Pointer primitive to attempt to retransfer the data. The MC keeps the last data buffer intact until the next command is generated by the SMBus host.

Figure 8:
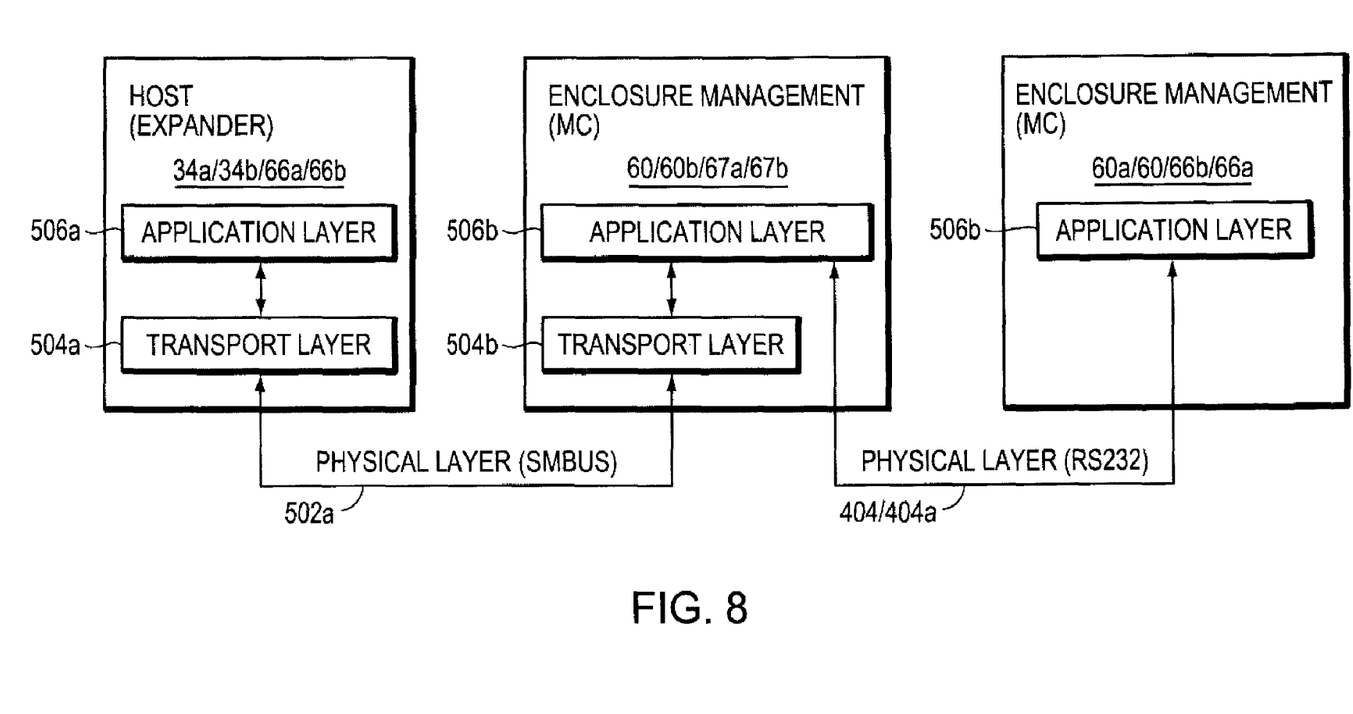

FIG. 8 illustrates that MC to peer MC communication operates by use of physical and application layers much like the MC to user terminal use of physical and application layers. Physical layer 404/404a is a TTL level RS-232 interface that runs at 9600 baud, 8 data bits, no parity, 1 stop bit.

The MC supports application layer commands including commands described below that require the MC to communicate with its MC peer. In at least one implementation, split transactions are not supported; application layer commands need to be completed before another can be started.

A peer status message is transmitted (e.g., at a rate of 10 Hz). It provides a means of transferring status information from SP A to SP B or SEB A to SEB B (and vice versa). The MC may cease transmitting the peer status message if it is processing either of the download commands.

The peer status message is formatted as follows: "s", followed by a block of binary data, and terminated by "%2.2x \n", CRC. The block of binary data is organized as defined below and the most significant bit of the word defined in position 1 is transmitted first:

Position 1
Command: Message ID: unsigned 32 bit binary word
This field is incremented by one every time a new message is transmitted. The message rolls over from FFFF FFFF to 0000 0000.

Position 2
Command: Status 1: unsigned 32 bit binary word
This is a bit encoded hex digit.
Bit 7: 1 means CPU fan fault (most significant bit).
Bit 6: 1 means pushbutton held for 4 seconds.
Bit 5: 1 means power supply present.
Bit 4: 1 means power supply fault
Bit 3: 1 means system state 's0'.
Bit 2: 1 means remote shutdown request.
Bit 1: 1 means system reset status.
Bit 0: 1 means system reset command (least significant bit).

Peer data is saved and treated as valid if the Message ID field has been incremented from the last message and the CRC is valid.

Upon receipt of a "Power Down" command (ASCII "d[0: 4]") the MC immediately echoes the command by returning the string "d0\n" or "d1\n" or "d2\n" back to the SMBus host. In the event the parameter following "d" is out of range, the MC returns "?9\n".

The MC then begins normal power down sequencing. Since this command is generated by the SMBus host, it is safe to power down the SP. The Power down command is defined as:

| | |
|---|---|
| d[0] | Shut local down. |
| d[1] | Shut peer down. |
| d[2] | Shut both local and peer down. |
| d[3] | Bounce power local side SP/SEB. |
| d[4] | Bounce power peer side SP/SEB. |

Upon receipt of an "Initialize (Reset) System" command (ASCII "i") the MC echoes the command by returning the string "i0\n" or "i1\n" and resets the SMBus host. In the event the parameter following "i" is out of range, the MC returns "?4\n".

| | |
|---|---|
| i[0] | Reset local side SP/SEB |
| i[1] | Reset peer side SP/SEB. |
| i[2] | Reset local expander. |
| i[3] | Reset peer expander. |

Upon receipt of a "System Status" command (ASCII "s" or "S"), the MC immediately returns the string "s%x\n", status. Status is a character string defined as follows:

Message Position 2
Command Status 2: ASCII "0:F"
This is a bit encoded hex digit.
Bit 3: 1 means a local power supply is present (most significant bit).
Bit 2: 1 means a local power supply fault.
Bit 1: 1 means a peer power supply is present.
Bit 0: 1 means a peer power supply fault (least significant bit).

Message Position 3
Command Status 3: ASCII "0:F"
This is a bit encoded hex digit.
Bit 3: 1 means a local CPU fan fault (most significant bit).
Bit 2: 1 means a peer CPU fan fault.
Bit 1: 1 means a system fan 1 fault.
Bit 0: 1 means a system fan 2 fault (least significant bit).

Message Position 5
Command Status 3: ASCII "0:F"
This is a bit encoded hex digit.
Bit 3: 1 means a local CPU fan warning (most significant bit).
Bit 2: 1 means a peer CPU fan warning.
Bit 1: 1 means a system fan 1 warning.
Bit 0: 1 means a system fan 2 warning (least significant bit).

Upon receipt of a "Buffer Read" command (ASCII "p") followed by one ASCII control character which identifies the source and block size of the buffer, and two ASCII address characters which identifies the block within the buffer, the MC immediately returns the string "p%s%s", control character, block, followed by a block of binary data, and terminated by "\n". The amount of data returned by this command is dependent upon the initial control character. In at least one implementation, a block size (e.g., 32 bytes) is equal to the size of the smallest block that can be read at a time from onboard EEPROMs.

Control Character A
Local Fault Register
Size=1 block, Block size=32 Bytes
Control Character B
Peer Fault Register
Size=1 block, Block size=32 Bytes
Control Character C
Shared VPD EEPROM
Size=128 blocks, Block size=32 Bytes
Control Character D
Local VPD EEPROM
Size=128 blocks, Block size=32 Bytes
Control Character E
Peer VPD EEPROM
Size=128 blocks, Block size=32 Bytes
Control Character F
Local Personality Card VPD EEPROM
Size=128 blocks, Block size=32 Bytes
Control Character G
Peer Personality Card EEPROM
Size=128 blocks, Block size=32 Bytes The block address consists of two ASCII characters which range from "00" to "FF". "00" corresponds to the first (32 byte) block within the buffer, "01" corresponds to the second block within the buffer.

If an illegal control character is received, the MC returns ASCII "?0\n". If an illegal block address is received, the MC returns ASCII "?1\n". If the data cannot be retrieved, the MC returns ASCII "?2\n".

Upon receipt of the "Buffer Write" command (ASCII "q") followed one ASCII control character which identifies the source and size of the buffer, two ASCII address characters which identify the block within the buffer, and 32 binary data characters, the MC immediately stores the data and then returns the string "q\n". The amount of data stored by this command is dependent upon the initial control character. Handling of control characters and other parameters of the "Buffer Write" command is the same as in the case of the "Buffer Read" command above.

The block address consists of two ASCII characters which range from "00" to "FF". "00" corresponds to the first (32 byte) block within the buffer, "01" corresponds to the second block within the buffer.

If an illegal control character is received, the MC returns ASCII "?0\n". If an illegal block address is received, the MC returns ASCII "?1\n". If the data cannot be stored, the MC returns ASCII "?2\n".

Commands described above require the SP or SEB to gather information from or otherwise interact with its peer SP or SEB. The following example demonstrates how the MC and the MC peer accomplish this interaction to satisfy the needs of the commands.

In the example (FIG. 9), SPA 20a (FIG. 2) needs data from block 5 of VPD EEPROM 62'b (FIG. 3).

Figure 9:
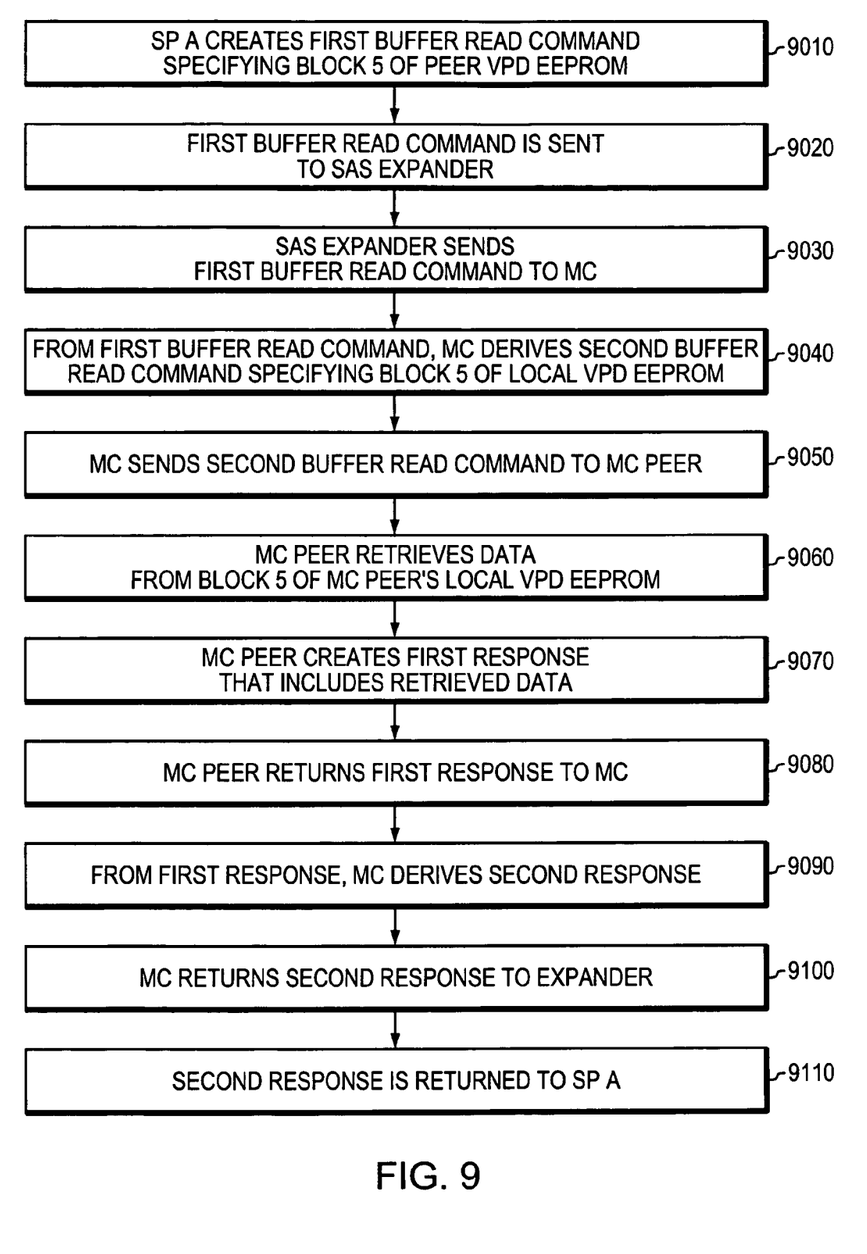
FIG. 9 is a flow diagram of a procedure for use with a management controller in a RAID data storage system with SAS expansion.

SPA 20a creates a first buffer read command specifying block 5 of the peer VPD EEPROM (step 9010).

The first buffer read command is sent via SAS controller 32 and SAS expander 34a of SPA 20a (FIG. 2) to SAS expander 66a of SEB 64a (FIG. 3) (step 9020).

SAS expander 66a of SEB 64a sends the first buffer read command to MC 67a of SEB 64a (step 9030).

The peer VPD EEPROM is the MC peer's local VPD EEPROM 62'b. From the first buffer read command, the MC derives a second buffer read command specifying block 5 of the local (i.e., the MC peer's) VPD EEPROM (step 9040). In at least one implementation, the derivation may include creating the second buffer read command as a near duplicate of the first buffer read command, with the only difference being the control character, so that "local VPD EEPROM" is specified instead of "peer VPD EEPROM".

The MC (here, MC 67a) sends the second buffer read command to the MC peer (here, MC 67b) (step 9050).

The MC peer retrieves data from block 5 of the MC peer's local VPD EEPROM (step 9060).

The MC peer creates a first response that includes the retrieved data (step 9070).

The MC peer returns the first response to the MC (step 9080). This completes processing of the second buffer read command.

From the first response, the MC derives a second response (step 9090). In at least one implementation, the derivation may include creating the second response as a near duplicate as a near duplicate of the first response, with the only difference being the control character, so that "peer VPD EEPROM" is specified instead of "local VPD EEPROM".

The MC (here, MC 67a) returns the second response to expander 66a of SEB 64a (step 9100).

The second response is returned to SP A 20a via SAS expander 34a and SAS controller 32 of SPA 20a (FIG. 2) (step 9110), which completes processing of the first buffer read command.

One or more embodiments of the invention have been described. Nevertheless, it will be understood that various modifications may be made without departing from the spirit and scope of the invention. Accordingly, other embodiments are within the scope of the following claims.

What is claimed is:

1. A data storage system, comprising:
   a bank of disk drives;
   a first board disposed in a chassis, the first board having disposed thereon a first Serial Attached Small Computer Systems Interface (SAS) expander, a first management controller (MC) in communication with the first SAS expander, and a management resource accessible to the first MC; wherein the first (SAS) expander is coupled between the first MC and the bank of disk drives;
   a second board disposed in the chassis, the second board having disposed thereon a second SAS expander and a second MC; wherein the second (SAS) expander is coupled between the second MC and the bank of disk drives; and
   a communications link between the first and second MCs;
   wherein primary access to the management resource is provided in a first path which is through the first SAS expander and the first MC, and secondary access to the management resource is provided in a second path which is through the second SAS expander and the second MC.

2. The data storage system of claim 1, wherein at least one of the first and second SAS expanders serves as an System Management Bus (SMBus) host to one of the first and second MCs.

3. The data storage system of claim 1, wherein the first and second MCs communicate over a serial link.

4. The data storage system of claim 1, wherein at least one of the first and second MCs communicates with the management resource over an Inter- Integrated Circuit (I2C) link.

5. The data storage system of claim 1, wherein the second path includes a third SAS expander which is external to the chassis.

6. The data storage system of claim 1, wherein at least one of the SAS expanders communicates via physical, transport, and application layers with at least one of the MCs.

7. The data storage system of claim 1, wherein the second MC is configured to transmit a status message to the first MC.

8. The data storage system of claim 1, wherein the second MC is configured to transmit a power down message to the first MC.

9. The data storage system of claim 1, wherein the second MC is configured to transmit a reset message to the first MC.

10. The data storage system of claim 1, wherein the first MC is configured to respond to a buffer read message from the second MC.

11. The data storage system of claim 1, wherein the first MC is configured to respond to a buffer write message from the second MC.

12. A method for use in managing management controller communications, the method comprising:
    creating a first command;
        sending the first command via a Serial Attached Small Computer Systems Interface (SAS) controller and a first SAS expander to a second SAS expander;
    sending the first command from the second SAS expander to a first management controller (MC) wherein the first (SAS) expander is coupled between the first management (MC) controller and a bank of disk drives and wherein the second (SAS) expander is coupled between a second management (MC) controller and a bank of disk drives; and
deriving a second command from the first command.

13. The method of claim 12, further comprising:
sending the second command from the first MC to the second MC).

14. The method of claim 13, further comprising:
generating a first response to the second command.

15. The method of claim 14, further comprising:
sending the first response from the second MC to the first MC.

16. The method of claim 15, further comprising:
deriving a second response from the first response.

17. The method of claim 16, further comprising:
sending the second response to the second SAS expander.

18. The method of claim 17, further comprising:
sending the second response via the first SAS expander and the SAS controller.

* * * * *